June 29, 1926.
O. WERNECKE
1,590,920
CALCULATING MACHINE
Filed Feb. 29, 1924
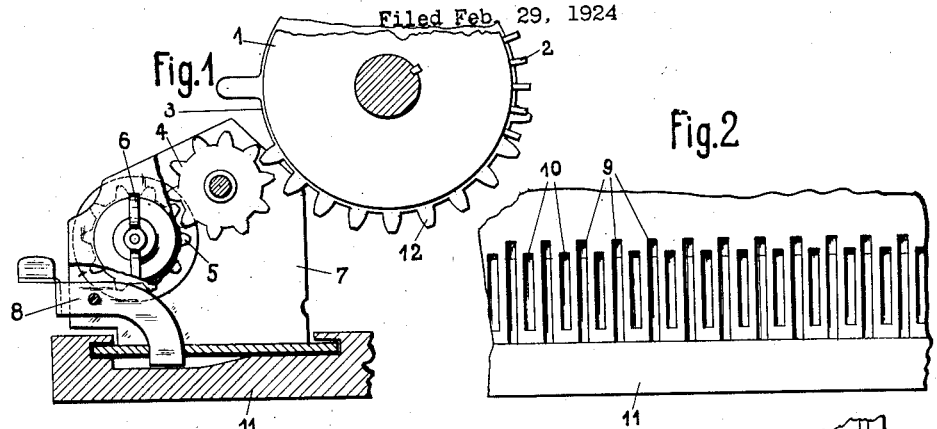
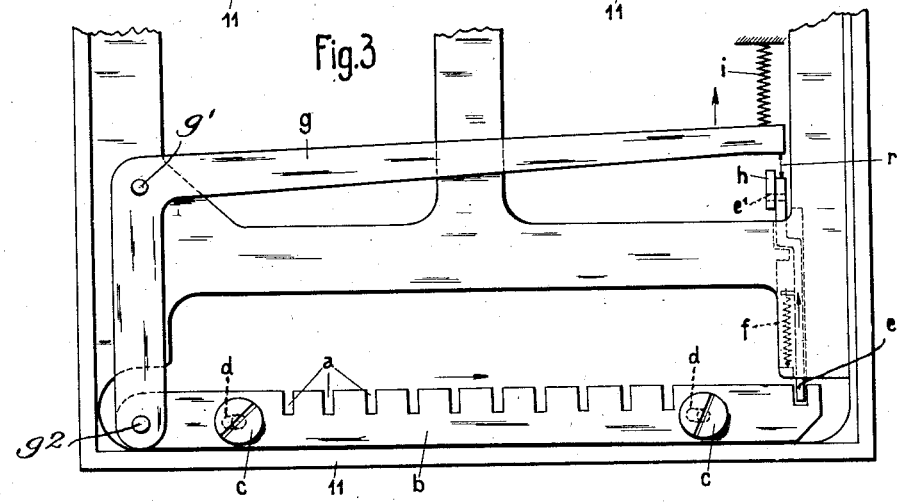
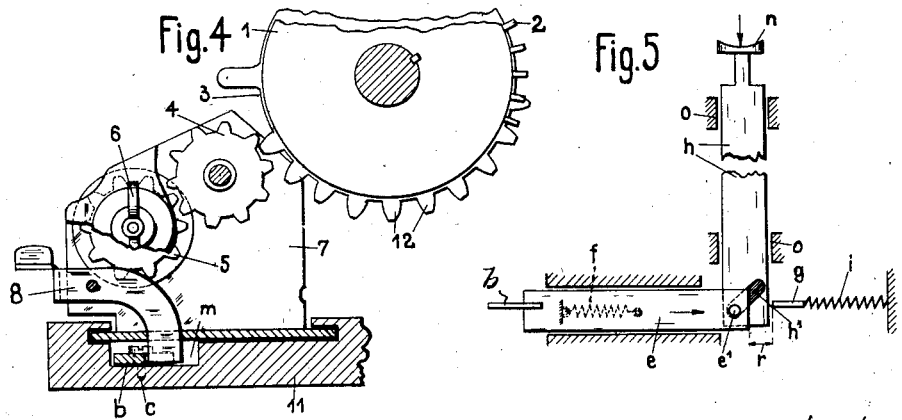
Inventor
Otto Wernecke
by James L. Norris
Associate Attorney Patented June 29, 1926.

1,590,920

UNITED STATES PATENT OFFICE.

OTTO WERNECKE, OF BRUNSWICK, GERMANY, ASSIGNOR TO GRIMME, NATALIS & CO., AKTIENGESELLSCHAFT, OF BRUNSWICK, GERMANY, A CORPORATION OF GERMANY.

CALCULATING MACHINE.

Application filed February 29, 1924, Serial No. 695,983, and in Germany March 7, 1923.

My invention relates to improvements in calculating machines, and more particularly to those machines of the type in which the setting disks of a setting mechanism are each provided with nine teeth adapted to be shifted in radial direction by cam disks which are rotatable for transmitting values set thereon to the numeral wheels of the registering mechanism by means of transmission gears. In machines of this type means have been provided for carrying the values from the registering mechanism to the setting mechanism consisting of gears connected with the individual cam disks and adapted to be operated by the said transmission gears after shifting a slide which carries the registering mechanism and the transmission gears into position for engagement with the gears of the cam disks. For fixing the slide in the proper positions additional slots must be provided in the guide of the slide, which is objectionable because the base plate is weakened and the setting of the slide in the proper positions is rendered difficult.

An object of the improvements is to provide a machine of the class referred to in which the number of the said slots or stops is reduced, and with this object in view I provide the said slots or stops on a slide which is shiftable relatively to the frame or housing of the machine.

For the purpose of explaining the invention an example embodying the same has been shown in the accompanying drawing in which the same reference characters have been used in all the views to indicate corresponding parts. In said drawing, Fig. 1, is a sectional view showing a part of the base plate, the slide carrying the registering mechanism, and the setting mechanism of the machine as now constructed, Fig. 2, is a partial plan view of the base plate of the machine shown in Fig. 1, Fig. 3, is a partial bottom view of the base plate of my improved machine, Fig. 4, is a sectional view similar to the one shown in Fig. 1 and illustrating my improved machine, and Fig. 5, is a detail view showing in side elevation the means for unlocking and shifting the bar provided for fixing the carriage of the registering mechanism in position, the associated parts of the machine being shown in section.

Referring first to the construction of Figs. 1 and 2, a calculating machine in which my invention may be embodied is shown which consists of setting disks 1 each having nine equidistantly spaced radial teeth 2 mounted thereon, cam disks 3 adapted to shift the teeth 2 outwardly and into operative position, transmission gears 4 operable to transmit the values set on the setting disks to numeral wheels 5, resetting means for the numeral wheels in the nature of a wing nut 6, a bracket or slide 7 carrying the numeral wheels 5, a latch lever 8 rockingly mounted on the slide 7 and adapted for engagement with either one of slots 9, 10 formed in the base plate 11, and gears 12 on the cam disks 3. The slide 7 is adapted to be shifted relatively to the setting mechanism or disks for bringing the numeral wheels 5 into position for receiving the values from any of the setting disks, or for transmitting the values from the numeral wheels to the setting disks, and it is adapted to be secured in any of its positions by engagement of the lever 8 with the corresponding slot 9 or 10.

A machine of the type referred to has been described in the United States Patent No. 952,257 granted March 15, 1910 to Jahnz.

The machine shown in Figs. 3 to 5 is similar to the one shown in Figs. 1 and 2 and the same reference characters have been used to indicate corresponding parts. The novel features of the machine are the following: A bar $b$ is disposed in a recess or groove $m$ of the base plate 11 said bar having notches $a$ in its rear edge which notches $a$ correspond to the slots 9 and 10 shown in Figs. 1 and 2. Elongated slots $d$ are also formed in the bar $b$ through which extend screws $c$ fixed to the base plate so as to permit the bar $b$ to be shifted or slide in a longitudinal direction a distance corresponding to the distance of the teeth 2 from the gears 12. The notches $a$ are spaced from one another a distance corresponding to the distance between adjacent setting disks, so that the slide 7 can be secured by means of levers 8 in any position corresponding to any of the setting disks 1 for transmitting the values from the setting disks to the numeral wheels. But when shifting the bar $b$ a distance corresponding to the length of the slots $d$ the numeral wheels are brought into positions for transmitting the values set thereon to the cam disks, so that, when operating the resetting mechanism, the values are carried from the numeral wheels to the cam disks and through the latter to the setting disks.

For securing the bar $b$ in the normal position shown in Fig. 3 and corresponding to the transmission of values from the setting disks to the registering mechanism, a slidable bolt $e$ is provided which is urged toward bar $b$ by a spring $f$. Said bolt may be retracted to permit the bar $b$ to be shifted by means of a bell-crank lever $g$ into the position corresponding to the transmission of values from the numeral wheels to the setting disks. The bell-crank lever $g$ is fulcrumed at $g'$ to the frame of the machine and connected at $g^2$ to the bar $b$. In Figs. 3 and 5 I have shown preferred means for actuating the bolt $e$ and the bell crank lever $g$ comprising a rod having an operating key $n$ thereon. Said rod $h$ is vertically movable in suitable guides $o$ formed in the machine frame and near its lower or inner end has an inclined slot $h^1$ engaged by a pin $e^1$ secured to the bolt $e$. After the bolt $e$ has been moved out of locking engagement with the bar $b$ the rear end of the bolt $e$ strikes against the bell crank lever $g$, which is therefore rocked and shifts the bar $b$ as described. It will be understood that the bar $b$ can be shifted in any position of the slide 7. As appears from Fig. 5 there is certain clearance $r$ between the end of the bolt $e$ and the bell crank lever $g$, so that the rail $b$ is first unlocked and thereafter shifted.

When the key $n$ is released a spring $i$ attached to the bell crank lever $g$ urges said lever and the bar $b$ into initial position, whereupon the bolt $e$ is moved into locking engagement with the bar $b$ by the spring $f$.

I claim:

1. In a calculating machine, in combination setting mechanism comprising setting members, registering mechanism comprising numeral wheels, and a carriage for the registering mechanism adapted to be shifted relatively to the setting mechanism, means for transmitting values from the numeral wheels to the setting members, a member shiftable relatively to the setting mechanism, means for locking the carriage relatively to said shiftable member comprising a locking device for said shiftable member, and means for first unlocking said shiftable member and thereafter shifting the same for setting the registering mechanism in position for carrying values to the setting mechanism.

2. In a calculating machine, in combination setting mechanism comprising setting members, registering mechanism comprising numeral wheels, a carriage for the registering mechanism adapted to be shifted relatively to the setting mechanism, means for transmitting values from the numeral wheels to the setting members, a member shiftable relatively to the setting mechanism, means for locking the carriage relatively to said shiftable member comprising a bolt adapted for locking engagement with said shiftable member, and means for shifting said shiftable member for setting the registering mechanism in position for carrying values to the setting mechanism.

3. In a calculating machine, in combination, setting mechanism, registering mechanism coacting therewith and movable relatively thereto, a shiftable keeper means, means to latch the registering mechanism to said keeper means in positions for transmitting values from the registering mechanism to the setting mechanism, a lock normally holding said keeper means against shifting, and means for releasing the lock from the keeper means and to unitarily shift the keeper means and registering mechanism to position the latter for carrying values to the setting mechanism.

4. In a calculating machine, in combination, setting mechanism, registering mechanism coacting therewith and movable relatively thereto, a shiftable keeper, means to latch the registering mechanism to said keeper in positions for transmitting values from the registering mechanism to the setting mechanism, locking means normally engaging said keeper to hold the latter against shifting, a bell-crank lever having one arm associated with said keeper and its other arm in the path of unlocking movement of said locking means, and means operable to disengage said locking means from said keeper and move it into engagement with the latter arm of said lever to unitarily shift the keeper and registering mechanism to position the latter for carrying values to the setting mechanism.

5. In a calculating machine, in combination, setting mechanism, registering mechanism coacting therewith and movable relatively thereto, a shiftable keeper, means to latch the registering mechanism to said keeper in positions for transmitting values from the registering mechanism to the setting mechanism, a lock normally holding said keeper against shifting, means operable to shift the keeper after release of said lock, and means operable to move the lock out of engagement with the keeper into engagement with the keeper-shifting means to thereby release the keeper and then unitarily shift the keeper and registering mechanism into position to carry values to the setting mechanism.

6. In a calculating machine, in combination, setting mechanism, registering mechanism coacting therewith and movable relatively thereto, a slidably mounted keeper, means to latch the registering mechanism to said keeper in positions for transmitting values from the registering mechanism to the setting mechanism, a lock member for said keeper, means normally urging said lock member into engagement with said keeper to hold said keeper against sliding movement, a depressible actuating member, one of said members having a cam slot and the other member having a pin movable in said slot whereby depression of the actuating member will disengage the lock member from said keeper, and means associated with the keeper and actuated by the lock member after disengagement of the latter from the keeper for unitarily shifting the keeper and registering mechanism to position the latter for carrying values to the setting mechanism.

In testimony whereof I have hereunto set my hand.

OTTO WERNECKE.